United States Patent
Faccin et al.

(10) Patent No.: US 6,725,036 B1
(45) Date of Patent: Apr. 20, 2004

(54) SYSTEM AND METHOD OF CONTROLLING APPLICATION LEVEL ACCESS OF A SUBSCRIBER TO A NETWORK

(75) Inventors: Stefano Faccin, Dallas, TX (US); Rene Purnadi, Coppell, TX (US)

(73) Assignee: Nokia Telecommunications Ojy, Helsinki (FI)

( * ) Notice: Subject to any disclaimer, the term of this patent is extended or adjusted under 35 U.S.C. 154(b) by 330 days.

(21) Appl. No.: 09/580,425

(22) Filed: May 30, 2000

(51) Int. Cl.⁷ .................................................. H04Q 7/20
(52) U.S. Cl. .................................... 455/433; 379/15.02
(58) Field of Search ................................. 455/432, 433, 455/435.1, 445, 458, 432.1, 432.3; 370/338; 379/15.02, 88.2, 88.21, 114.06, 114.07

(56) References Cited

U.S. PATENT DOCUMENTS

| | | | | |
|---|---|---|---|---|
| 5,276,444 A | * | 1/1994 | McNair | 340/5.8 |
| 5,537,467 A | * | 7/1996 | Cheng et al. | 379/211.02 |
| 6,359,880 B1 | * | 3/2002 | Curry et al. | 370/352 |
| 6,430,276 B1 | * | 8/2002 | Bouvier et al. | 379/121.01 |

* cited by examiner

Primary Examiner—Nay Maung
Assistant Examiner—Tu X Nguyen
(74) Attorney, Agent, or Firm—Antonelli, Terry, Stout & Kraus, LLP (57) ABSTRACT

The invention is a system and method of controlling an application level of access of a subscriber to a network. The method includes sending an identification of the subscriber and an application level of access to be provided to the subscriber from a visited network of a plurality of networks (12, 14, 16) connected to a home network (10); in response to the identification of the subscriber and an application level of access to be provided to the subscriber, storing a subscriber profile of the authorized application level of access to be provided to the subscriber; and controlling access of the subscriber to any network dependent upon a comparison of the application level of service to be provided to the subscriber and the stored subscriber profile.

38 Claims, 5 Drawing Sheets

SYSTEM AND METHOD OF CONTROLLING APPLICATION LEVEL ACCESS OF A SUBSCRIBER TO A NETWORK

BACKGROUND OF THE INVENTION

The present invention relates to a system and method for controlling application level of access of a subscriber to a network.

DESCRIPTION OF THE PRIOR ART

Access to a home network through a visited network has been limited to a single level of access. As a result, subscriber equipment has not been portable across multiple visited networks which are connected to a home network in view of their functionality being limited to a single application level of access. In essence, each visited network through which a subscriber obtains access to a home network is limited to a single subscriber profile and does not provide for multiple subscriber profiles to facilitate different types of connectivity of a subscriber through a visited network to a home network.

SUMMARY OF THE INVENTION

The present invention is a system and method of controlling application level of access of a subscriber to any network. During application level registration, an application level message is sent from subscriber equipment connected to a visited network which is one of a plurality of networks connected to the home network. The application level message includes a subscriber identity and an application level of access to any network which may be the home network, any one of the plurality of networks or another network to which the subscriber may be connected. The application level of access may be in the form of an access mode ID comprised of a plurality of bits which uniquely identify one of a plurality of choices of application level of access which are available to any network to which the subscriber may connect subscriber equipment.

The networks connected to the home network in accordance with the invention are diverse in nature and without limitation may be a public cellular visited network such as a general packet radio system (GPRS), a wireline internet service provider (ISP), or a wireless local area network (LAN) such as, but without limitation, a local area network within a corporation. Regardless of the type of visited network, the application level registration message is sent from an entity in the visited network to an address of an entity in the home network which address is obtained from another network entity in the visited network. The entity in the home network receiving the application level registration message uses the received identification of the subscriber and the application level of access to fetch from a storage in the home network a subscriber profile which is to be used to provide connectivity to the user equipment in the visited network and any network in accordance with the specified application level of access in the application level registration message. The identification of the application level of access contained in the application level of registration message is a pointer to the subscriber profile specifying the application level of access and, upon fetching from the storage, is caused to be stored in a network entity either in the home network or in the visited network. The accessed subscriber profile is stored in the home network and accessed through a proxy entity in the visited network or is transmitted from the home network to the entity in the visited network from which the application level registration message was transmitted. Such entity is without limitation, a proxy server, gateway or serving call state control function (s-CSCF). The entity storing the subscriber profile in either the home network or the visited network functions to control the communications in accordance with well-known procedures for the subscriber user equipment in the visited network and the home network. If the visited network is a public cellular visited network, the entity receiving the subscriber profile for storage therein may be a s-CSCF; and if the visited network is a wireline ISP or a wireless LAN, the entity in the visited network receiving the subscriber profile may be a proxy server utilizing the session initiation protocol (SIP) or a gatekeeper in accordance with the H.323 specification. The entity in the visited network resolves the address in the home network to which the application level registration message is addressed may be a domain name server (DNS).

The application levels of access may be used to provide diverse types of connectivity. For example, the diverse types of connectivity may provide a different degree of bandwidth in communications for each different access, a different degree of secured communications for each different access, or different supported supplemental services for each different access which supplemental services may be diverse in nature, such as diverse telephony services without limitation thereof.

A method of controlling an application level of access of a subscriber to a network in accordance with the invention includes sending an identification of the subscriber and an application level of access to be provided to the subscriber from the visited network of a plurality of networks connected to the home network to the home network; in response to the identification of the subscriber and the application level of access by the home network, storing a subscriber profile of an authorized application level of access to be provided to the subscriber; and controlling access of the subscriber to any network dependent upon a comparison of an application level of service to be provided to the subscriber and the stored subscriber profile. The storing of the subscriber profile may be in the home network or may be in the visited network. Each application level of access may provide a different degree bandwidth in communications for each different access; a different degree of security in communications for each different access; or a different supported supplementary services for each different access. The home network may be an internet protocol network and the visited network may be a wireless public cellular bearer network. The public cellular bearer network may be a general packet radio system network. The home network may be an internet protocol network and the visited network may be an internet service provider. The home network may be an internet protocol network and the visited network may be a wireless local area network. The authorized application level of access may be chosen from a plurality of authorized application levels of access which may be granted to the subscriber between the plurality of connected networks and the home network. An application level registration message containing the identification of the subscriber and the application level of access may be generated in response to a request from subscriber equipment to a visited network entity; in response to an entity in the visited network receiving the request, an address of an entity in the home network may be obtained from a routing analysis in the visited network; and the application level registration message may be transmitted to the address in the home network. An entity of the home network may obtain the subscriber profile in response to receipt of the application level registration message.

A system in accordance with the invention includes a home network which stores a plurality of subscriber profiles each defining an application level of access to be provided to a subscriber to a network; a plurality of networks connected to the home network; subscriber equipment connected to a visited network of the plurality of networks through which the subscriber obtains an application level of access to any network; and wherein in response to connection of the subscriber equipment to the visited network, an identification of the subscriber and an application level of access to be provided to the subscriber is sent to the home network, and a subscriber profile of an authorized level of access to be provided to the subscriber is stored in one of the networks and access of the subscriber to any network is controlled by one of the networks storing the subscriber network dependent upon a comparison of the application level of service to be provided to the subscriber and the stored subscriber profile. A network entity within the home network or within the visited network may store the subscriber profile.

BRIEF DESCRIPTION OF THE DRAWINGS

Like parts are identically identified throughout the drawings.

DESCRIPTION OF THE PREFERRED EMBODIMENTS

Figure 1:
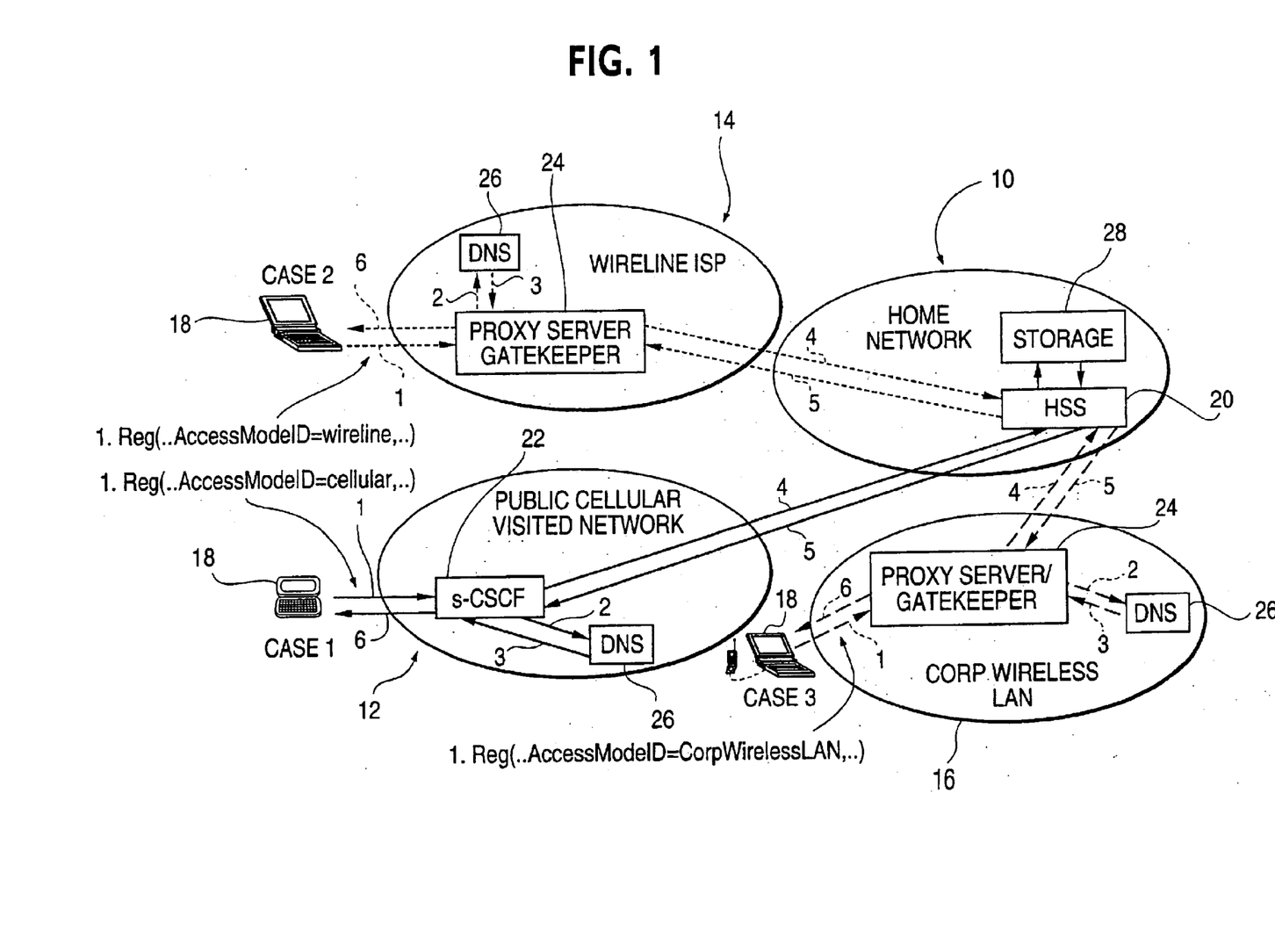
FIG. 1 illustrates a diagram of a plurality of networks connected to a home network in which the method of the present invention may be practiced.

FIG. 1 illustrates a home network 10 which is connected to a plurality of connected networks which, without limitation, may be as illustrated in FIG. 1 a public cellular visited network 12 such as GPRS, a wireline ISP 14 and a corporation wireless LAN 16. As illustrated, the connectivity of the particular subscriber equipment 18 is identified as "Case 1", "Case 2" and "Case 3" respectively between the public cellular visited network 12, wireline ISP 14 or corporation wireless LAN 16 and the home network 10. In each of the three cases, an application level registration message is sent from an entity, such as s-CSCF 22 or Proxy Server/Gatekeeper 24, in a visited one the plurality of networks 12, 14 and 16 connected to a home subscriber server (HSS) 20 or user mobility server (UMS) which contains the subscriber identification and the different application level profile for different access modes to be provided to the subscriber. The application level registration message contains an identification of the subscriber such as, but not limited to, the IMSI of the subscriber equipment 18 and the application level of access which is encoded as a multiple bit access mode identification and is transmitted from the network entity 22 or 24 in the visited network to the HSS 20 in the home network 10. In the public cellular visited network 12, the entity transmitting the application level registration message is a s-CSCF 22 which is well known; in the wireline ISP the entity transmitting the application level registration message is a proxy server/gatekeeper 24 which are well known with the proxy server using the SIP protocol or the gatekeeper being in accordance with the H.323 specification; and in the corporate wireless LAN 16, the network entity is also a proxy server/gatekeeper 24.

Case 1 operation is explained from an overview standpoint as follows. The subscriber utilizes subscriber equipment 18 to transmit message "1" to the s-CSCF 22 to request an application level registration through the public cellular visited network 12 to the home network 10. The s-CSCF 22 transmits message "2" to a DNS 26 which resolves the address of the HSS 20 to which the application level registration message is to be sent from the s-CSCF 22. The address is returned from the DNS 26 to the s-CSCF 22 as message "3". Thereafter the s-CSCF 22 transmits message "4" to the HSS 20 which contains the subscriber identification and an identification of the application level of connectivity which is sought. The HSS 20 retrieves from a storage 28 a subscriber profile of an authorized application level of access associated with the subscriber identified in the message received by the HSS 20. The storage 28 may be any home network entity and may be part of the HSS 20. The storage 28 stores for each of the connected networks 12, 14 and 16 or any other network, including networks other than the networks illustrated in FIG. 1 to which the subscriber may be connected to obtain telecommunications services, one of a plurality of selectable subscriber profiles defining the authorized level of access. Thereafter, when the home network decides that the call control will be located in the visited network in this embodiment, the network entity 20 transmits message "5" containing the subscriber profile containing the authorized application level of access to the s-CSCF 22 for storage therein. The retrieved subscriber profile is compared by the s-CSCF with the application level of service contained in a requested type of connection, which may be any type of telecommunications connection of the subscriber, through the visited network 12. The control of access of the subscriber in the visited network 12 is dependent upon a comparison of the application level of service which is sought to be provided to the subscriber by an attempt to connect the subscriber through the visited network 12 and the stored subscriber profile of the authorized application level of access.

Case 2 operates in a manner analogous to Case 1 with the communications "1"–"6" therein being of the same nature as described with respect to Case 1 with the exception that the visited network entity of the wireline ISP 14 is a proxy server/gatekeeper 24 instead of the s-CSCF 22 of the public cellular visited network 12.

Case 3 operates in a manner analogous to Case 1 with the communications "1"–"6" being of the same nature as described with respect to Case 1 with the exception that the visited network entity of the wireless LAN 16 is a proxy server/gatekeeper 24 instead of the s-CSCF 22 of the public cellular visited network 12.

The subscriber profiles of application level access which are available for communications between a subscriber through subscriber equipment 18 and any connected network are diverse in nature. For example, without limitation, the subscriber profiles may each identify a different application level of access providing a different degree of bandwidth in communications for each application level of different access; a different degree of security in communications for each different application level of access mode or different connection supplementary services for each different application level of access. For example, the use of different bandwidths for connectivity between the subscriber equipment and the visited network or the home network may be dependent upon an authorized expense of communications available to the subscriber, the functionality of the subscriber equipment or network conditions. For example, the different degrees of access for security purposes may be dependent upon the subscriber, the network or the subscriber equipment. As a result of the diversity of the types of access which may be requested by or allocated to the subscriber, it is possible to provide different types of connection services to the subscriber when connecting different types of subscriber equipment 18 through different networks 12, 14 and 16 or any other connected network including networks not illustrated in FIG. 1.

Figure 2:
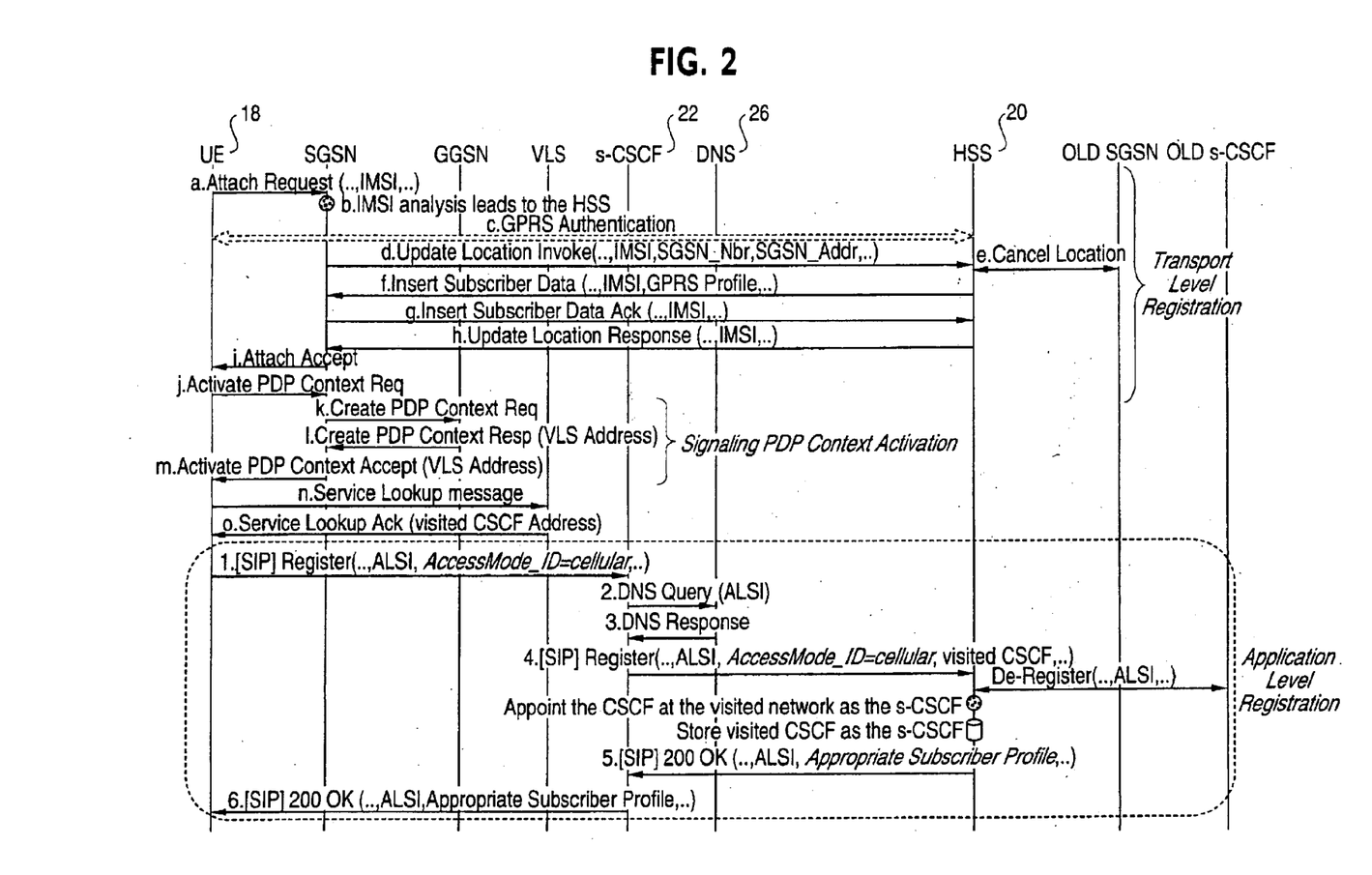
FIG. 2 illustrates a first embodiment of connectivity of a subscriber through subscriber equipment from a public cellular visited network to a home network in accordance with FIG. 1 assuming call control is at the visited network.
Figure 3:
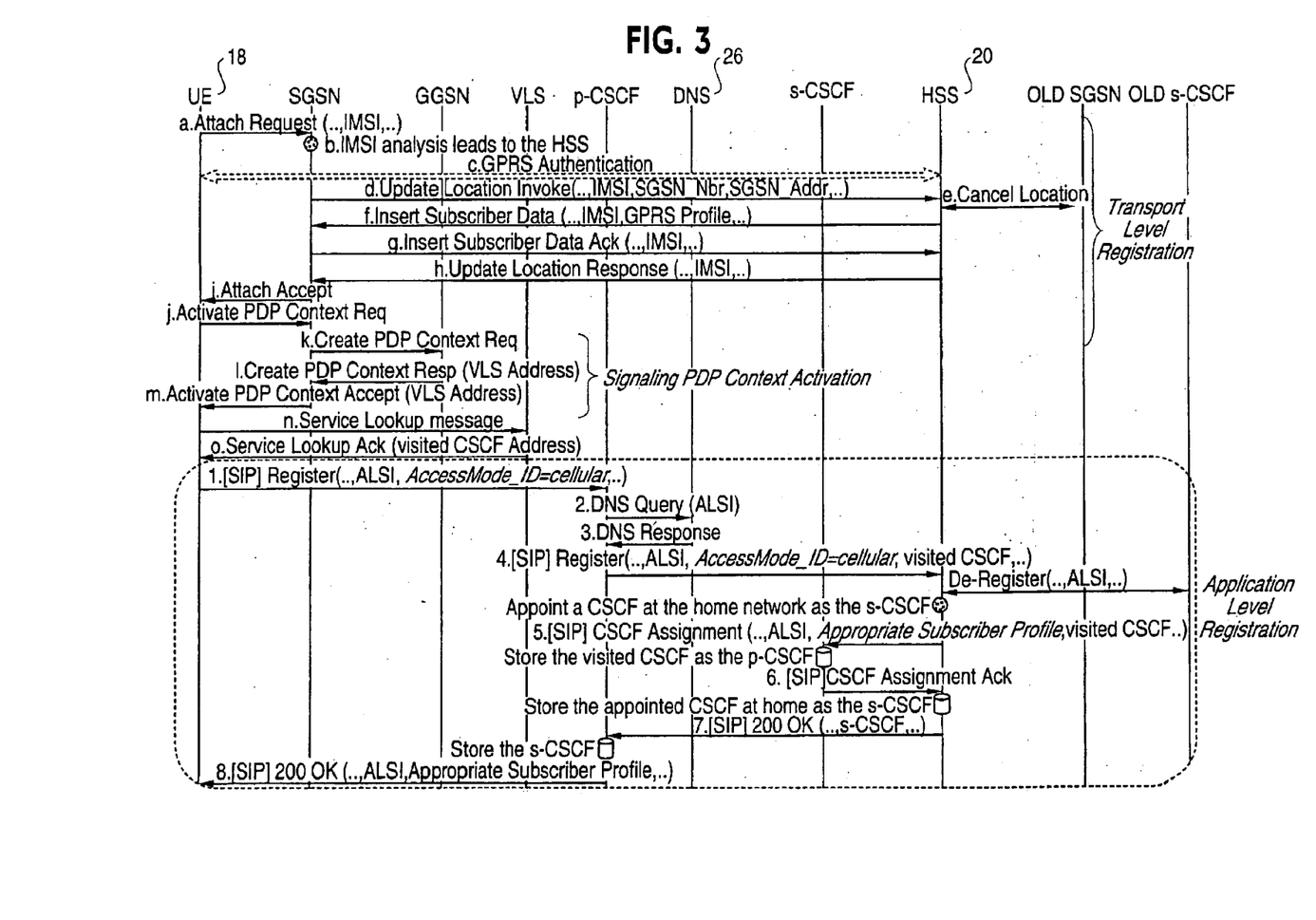
FIG. 3 illustrates a second embodiment of connectivity of a subscriber through subscriber equipment from a public cellular visited network to a home network in accordance with FIG. 1 assuming call control is at the home network.

FIGS. 2 and 3 illustrate detailed call flows for first and second embodiments of a public cellular visited network functioning as the visited network connected to the home activation network 10. The distinction between FIGS. 2 and 3 is that in FIG. 3 the s-CSCF, which controls the communications, resides in the home network with a p (proxy) -CSCF resides in the visited network 12 which functions as an intermediate entity in the providing of connectivity for the communications between the storage of the subscriber profiles of the application levels of access in the s-CSCF of the home network and the visited network. In essence the p-CSCF acts as a proxy call state control function in the visited network with the actual call state control function being exercised by the s-CSCF in the home network 10.

With reference to FIG. 2, the transport level registration procedure and the signalling PDP context establishment are generally in accordance with the prior art procedures for public cellular networks such as GPRS and therefore are only described briefly.

The conventional communications of FIG. 2 are described as follows: The communications begin with an attached request at "a" which contains the user equipment IMSI which is transmitted from the subscriber equipment to a serving GPRS support node. Thereafter, at "b" an IMSI analysis occurs in order to obtain the address of the HSS 20 in the home network 10. The next operation "c" is a GPRS authentication as illustrated by the bidirectional communications between the UE and the HSS 20. At "d" a communication is transmitted from the SGSN to the HSS 20. The HSS 20 replies back to the SGSN at "f" with an insert subscriber data message. The SGSN replies back to the HSS with an insert subscriber data acknowledgment at "g". The HSS 20 replies with an update location response at "h". The SGSN transmits an attachment acceptance at "i" to the UE. The UE transmits an activate PDP (packet data protocol) context request at "j" to the SGSN. The SGSN creates a PDP context request at "k" which is transmitted to a gateway GPRS support node. The SGSN transmits a create PDP context response at "l". The SGSN transmits an activate PDP context acceptance to the UE at "m". The UE transmits at "o" a service lookup message to a visited CSCF location server (VLS). This sequence contains the transport level registration and signalling PDP context activation.

The application level registration involving steps "1"–"6" is in accordance with the steps 1–6 described above with reference to FIG. 1. For each new application level registration message, a s-CSCF is associated with the subscriber profile which has been fetched in response to the application level registration message. With each new application level registration message, the previous s-CSCF is deactivated. This is identified by "De-Register ( . . . , ALSI, . . . )" in FIG. 2. The transmission of the subscriber profile to the s-CSCF of the visited network for storage therein provides the s-CSCF with the subscriber profile which is used for a comparison of the application level of service to be provided to the subscriber and the stored subscriber profile in order to control access of the subscriber to the network which may either be granted or denied depending upon whether the comparison yields that the application level of access does not exceed the stored application level of access contained in the subscriber profile. As illustrated, step "6" shows the authorization of the subscriber equipment in order to have connectivity which is identified in step 6 by "200 ok" which is a standard SIP designation for a granted authorization.

FIG. 3, as discussed above, is analogous to FIG. 2 except that the s-CSCF is resident in the home network 10 and a p-CSCF is resident in the visited network through which the communications involving the application of a registration message are routed between the UE and the HSS 20 of the home network 10. As a result of the p-CSCF being resident in the visited network 12, additional messages "[SIP]CSCF assignment" identified as "5" and "[SIP]CSCF Assignment Ack" identified as "6" are required but otherwise the communications are identical to FIG. 2. Messages 5 and 6 are used by the HSS 20 to assign a s-CSCF in the home network and download the subscriber profile to the s-CSCF.

Figure 4:
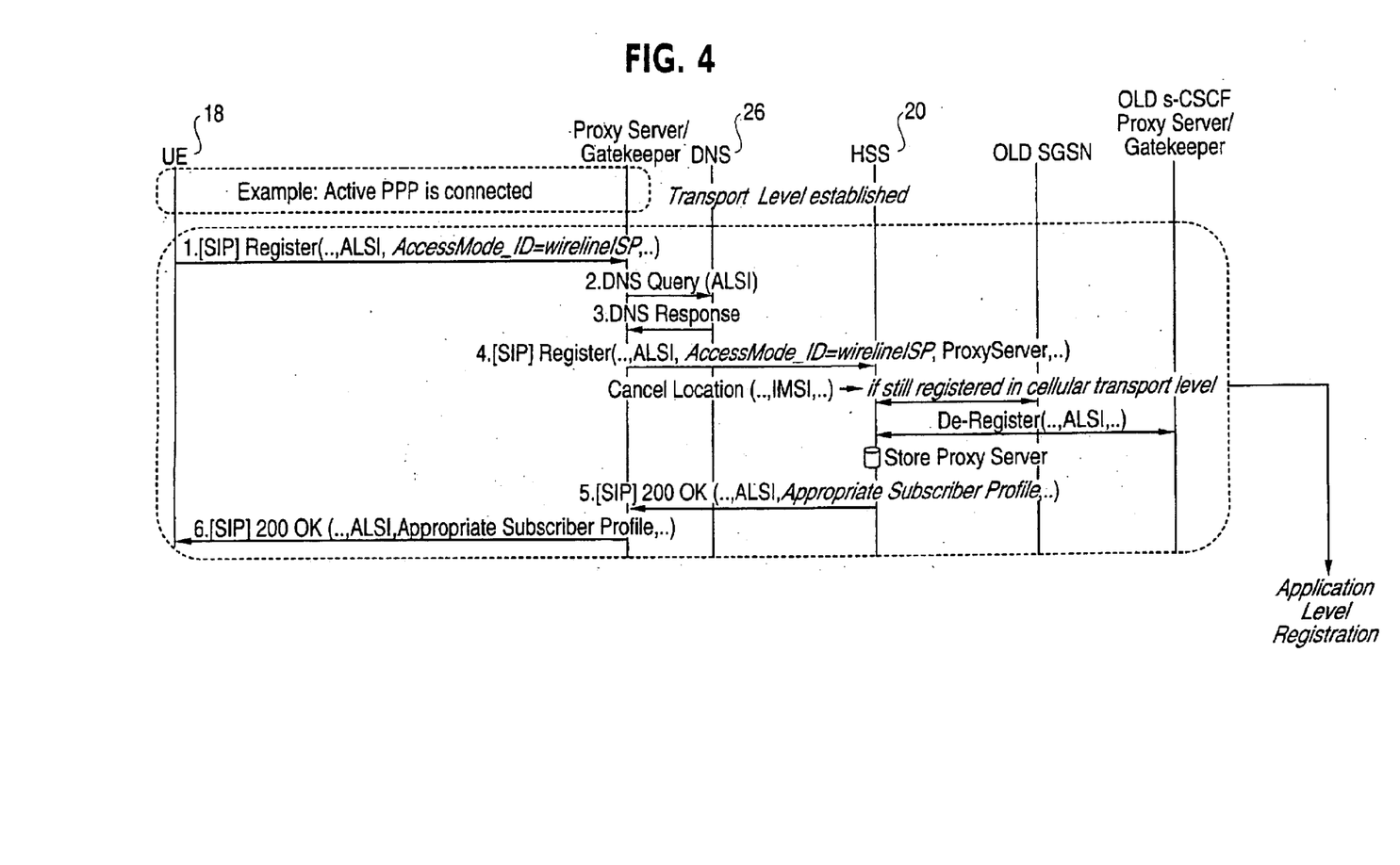
FIG. 4 illustrates connectivity of a subscriber through subscriber equipment through a wireline ISP to a home network in accordance with the present invention.

FIG. 4 illustrates the sequence of communications for the wireline ISP 14 with the transport level registration process which is well known having been established. The communications "1"–"6" are in accordance with FIG. 1 except that the deregistration process between the HSS and an old SGSN and an old one of a s-CSCF/Proxy Server/Gatekeeper are illustrated involving previous application level registration messages. The communications "1"–"6" are analogous to the communications of FIGS. 2 and 3 with the exception that the proxy server is the entity in the wireline ISP 14 through which the application level registration message communications are routed and further which stores the fetched subscriber profile.

Figure 5:
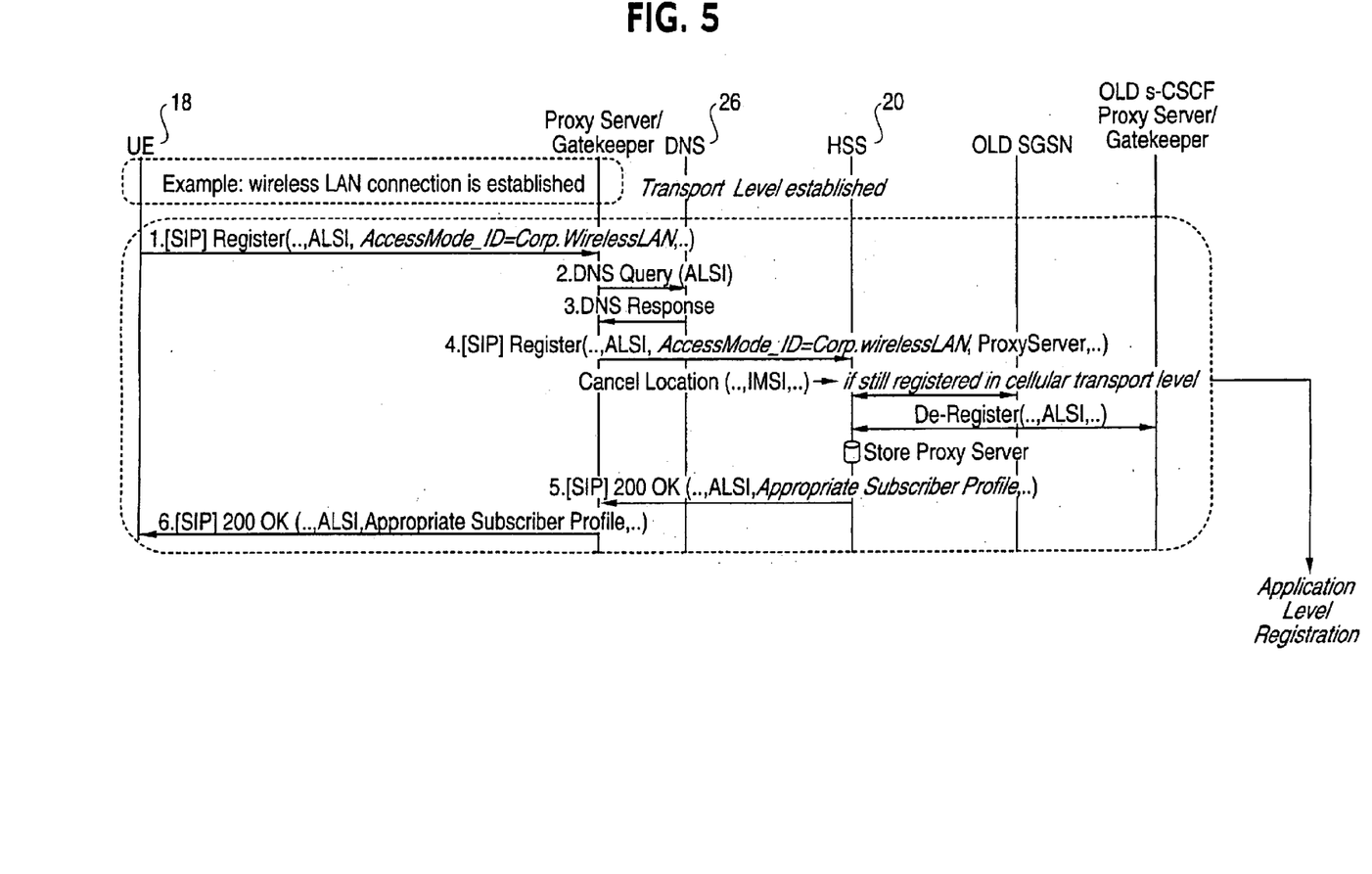
FIG. 5 illustrates connectivity of a subscriber through subscriber equipment through a wireless LAN to a home network in accordance with the present invention.

FIG. 5 illustrates the sequence of communications between the corporate wireless LAN 16 and the home network 10. The transport level registration process, which is well known, is established. The communications "1"–"6" are in accordance with FIG. 1 except that the deregistration process between the HSS and an old SGSN and an old one of a s-CSCF/Proxy Server/Gatekeeper are illustrated involving previous application level registration messages.

While the invention has been described in terms of its preferred embodiments, it should be understood that numerous modifications may be made thereto without departing from the spirit and scope of the appended claims. It is intended that all such modifications fall within the scope of the appended claims.

What is claimed is:

1. A method of controlling an application level of access of a subscriber to any of a plurality of networks comprising:

sending an identification of the subscriber and an application level of access to be provided to the subscriber from a visited network which is one of the plurality of networks and is connected to a home network;

in response to the identification of the subscriber and the application level of access to be provided to the subscriber in any of the plurality of networks or the home network, storing a subscriber profile of an authorized application level of access to be provided to the subscriber in any of the plurality of networks or the home network; and controlling access of the subscriber to any of the plurality of networks or the home network through subscriber equipment and the visited network dependent upon a comparison of a request for an application level of service to be provided to the subscriber in the plurality of networks or the home network and the stored subscriber profile.

2. A method in accordance with claim 1 wherein:
the application level of service comprises a requested type of telecommunication connection of the subscriber through the subscriber equipment and the visited network.

3. A method in accordance with claim 2 wherein:
the storing of the subscriber profile is in the home network.

4. A method in accordance with claim 2 wherein:
the storing of the subscriber profile is in the visited network.

5. A method in accordance with claim 2 wherein:
each application level of access provides a different degree of bandwidth in communications for each different access.

6. A method in accordance with claim 2 wherein:
each application level of access provides for a different degree of security in communications for each different access.

7. A method in accordance with claim 2 wherein:
each application level of access provides different connection supplementary services for each different access.

8. A method in accordance with claim 3 wherein:
each application level of access provides a different degree of bandwidth in communications for each different access.

9. A method in accordance with claim 3 wherein:
each application level of access provides for a different degree of security in communications for each different access.

10. A method in accordance with claim 3 wherein:
each application level of access provides different connection supplementary services for each different access.

11. A method in accordance with claim 4 wherein:
each application level of access provides a different degree of bandwidth in communications for each different access.

12. A method in accordance with claim 4 wherein:
each application level of access provides for a different degree of security in communications for each different access.

13. A method in accordance with claim 4 wherein:
each application level of access provides different connection supplementary services.

14. A method in accordance with claim 2 wherein:
the home network is an internet protocol network and the visited network is a wireless public cellular bearer network.

15. A method in accordance with claim 14 wherein:
the public cellular bearer network is a general packet radio system network.

16. A method in accordance with claim 2 wherein:
the home network is an internet protocol network and the visited network is an internet service provider.

17. A method in accordance with claim 2 wherein:
the home network is an internet protocol network and the one visited network is a wireless local area network.

18. A method in accordance with claim 2 wherein:
the authorized application level of access is chosen from a plurality of authorized application levels of access which may be granted to the subscriber.

19. A method in accordance with claim 3 wherein:
the authorized application level of access is chosen from a plurality of authorized application levels of access which may be granted to the subscriber.

20. A method in accordance with claim 4 wherein:
the authorized application level of access is chosen from a plurality of authorized application levels of access which may be granted to the subscriber.

21. A method in accordance with claim 5 wherein:
the authorized application level of access is chosen from a plurality of authorized application levels of access which may be granted to the subscriber.

22. A method in accordance with claim 6 wherein:
the authorized application level of access is chosen from a plurality of authorized application levels of access which may be granted to the subscriber.

23. A method in accordance with claim 7 wherein:
the authorized application level of access is chosen from a plurality of authorized application levels of access which may be granted to the subscriber.

24. A method in accordance with claim 8 wherein:
the authorized application level of access is chosen from a plurality of authorized application levels of access which may be granted to the subscriber.

25. A method in accordance with claim 9 wherein:
the authorized application level of access is chosen from a plurality of authorized application levels of access which may be granted to the subscriber.

26. A method in accordance with claim 10 wherein:
the authorized application level of access is chosen from a plurality of authorized application levels of access which may be granted to the subscriber.

27. A method in accordance with claim 11 wherein:
the authorized application level of access is chosen from a plurality of authorized application levels of access which may be granted to the subscriber.

28. A method in accordance with claim 12 wherein:
the authorized application level of access is chosen from a plurality of authorized application levels of access which may be granted to the subscriber.

29. A method in accordance with claim 13 wherein:
the authorized application level of access is chosen from a plurality of authorized application levels of access which may be granted to the subscriber.

30. A method in accordance with claim 14 wherein:
the authorized application level of access is chosen from a plurality of authorized application levels of access which may be granted to the subscriber.

31. A method in accordance with claim 16 wherein:
the authorized application level of access is chosen from a plurality of authorized application levels of access which may be granted to the subscriber.

32. A method in accordance with claim 17 wherein:
the authorized application level of access is chosen from a plurality of authorized application levels of access which may be granted to the subscriber.

33. A method in accordance with claim 2 wherein:

an application level registration message containing the identification of the subscriber and the application level of access is generated in response to a request from subscriber equipment to a visited network entity;

in response to an entity in the visited network receiving the request, an address of an entity in the home network to which the application level registration message, including the identification of the subscriber and the application level of access is sent, is obtained from a routing analysis in the visited network; and the application level registration message is transmitted to the address in the home network.

34. A method in accordance with claim 33 wherein:

an entity of the home network obtains the subscriber profile in response to receipt of the application level registration message.

35. A system comprising:

a plurality of networks;

a home network, connected to the plurality of networks, which stores a plurality of subscriber profiles, each profile defining an application level of access to be provided to a subscriber to any of the plurality of networks or the home network;

subscriber equipment connected to a visited one of the plurality of networks through which the subscriber obtains an application level of access to any of the plurality of networks or the home network; and wherein in response to connection of the subscriber equipment to the visited network, an identification of the subscriber and an application level of access to be provided to the subscriber is sent to the home network, and a subscriber profile of an authorized application level of access to be provided to the subscriber is stored in one of the plurality of networks or the home network and access of the subscriber to any of the networks or the home network through the subscriber equipment and the visited network is controlled, by the one of networks storing the subscriber profile, dependent upon a comparison of a request for an application level of service to be provided to the subscriber in the plurality of networks or the home network and the stored subscriber profile.

36. A system in accordance with claim 35 wherein:

the application level of service comprises a requested type of telecommunication connection of the subscriber through the subscriber equipment and the visited network.

37. A system in accordance with claim 36 further comprising:

a network entity within the home network which stores the subscriber profile.

38. A system in accordance with claim 36 further comprising: a network entity within the visited network which stores the subscriber profile.

* * * * *